US011778263B2

(12) United States Patent
Tang et al.

(10) Patent No.: US 11,778,263 B2
(45) Date of Patent: Oct. 3, 2023

(54) LIVE STREAMING VIDEO INTERACTION METHOD AND APPARATUS, AND COMPUTER DEVICE

(71) Applicant: SHANGHAI HODE INFORMATION TECHNOLOGY CO., LTD., Shanghai (CN)

(72) Inventors: Zixin Tang, Shanghai (CN); Dewei Xue, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/783,267

(22) PCT Filed: Aug. 18, 2020

(86) PCT No.: PCT/CN2020/109871
§ 371 (c)(1),
(2) Date: Jun. 8, 2022

(87) PCT Pub. No.: WO2021/114710
PCT Pub. Date: Jun. 17, 2021

(65) Prior Publication Data
US 2023/0012089 A1 Jan. 12, 2023

(30) Foreign Application Priority Data
Dec. 9, 2019 (CN) .......................... 201911251115.7

(51) Int. Cl.
*H04N 21/431* (2011.01)
*H04N 21/2187* (2011.01)
(Continued)

(52) U.S. Cl.
CPC ....... *H04N 21/431* (2013.01); *H04N 21/2187* (2013.01); *H04N 21/42204* (2013.01);
(Continued)

(58) Field of Classification Search
CPC ......... H04N 21/2187; H04N 21/42204; H04N 21/44008; H04N 21/47205; H04N 21/4788
(Continued)

(56) References Cited

U.S. PATENT DOCUMENTS 10,873,697 B1 * 12/2020 Jain ................. H04N 21/234318
2015/0365627 A1 12/2015 Deng et al.
(Continued)

FOREIGN PATENT DOCUMENTS

CN 107765855 A 3/2018
CN 108462883 A 8/2018
(Continued)

OTHER PUBLICATIONS

International Patent Application No. PCT/CN2020/109871; Int'l Search Report; dated Oct. 10, 2020; 2 pages.

*Primary Examiner* — Dominic D Saltarelli
(74) *Attorney, Agent, or Firm* — BakerHostetler

(57) ABSTRACT

The present application discloses techniques of interacting with live videos. The techniques comprise obtaining a streaming video of a live streamer and images of a user captured in real time by a user terminal, and displaying the streaming video and the image of the user in a same video play box; obtaining and recognizing a first gesture of a user in the images of the user, and comparing the first gesture with a second gesture included in a preset table, wherein the preset table comprises information indicating corresponding relationships between gestures and special effects; obtaining a first special effect corresponding to the second gesture by
(Continued)

querying the preset table when the first gesture matches with the second gesture; and displaying the first special effect in the video play box.

19 Claims, 6 Drawing Sheets

(51) Int. Cl.
  *H04N 21/422* (2011.01)
  *H04N 21/44* (2011.01)
  *H04N 21/47* (2011.01)
  *H04N 21/472* (2011.01)
  *H04N 21/4788* (2011.01)
(52) U.S. Cl.
  CPC ... *H04N 21/44008* (2013.01); *H04N 21/4788* (2013.01); *H04N 21/47205* (2013.01)
(58) Field of Classification Search
  USPC .......................................................... 725/37
  See application file for complete search history.

(56) References Cited

U.S. PATENT DOCUMENTS

| | | |
|---|---|---|
| 2018/0032224 A1 | 2/2018 | Cornell et al. |
| 2018/0107278 A1* | 4/2018 | Goel ...................... G06F 3/0426 |
| 2020/0114931 A1* | 4/2020 | Rao ........................ B60W 40/09 |
| 2020/0389754 A1* | 12/2020 | Prasso ....................... G06T 7/74 |
| 2022/0051448 A1* | 2/2022 | Steinwedel ...... H04N 21/41407 |
| 2022/0130146 A1* | 4/2022 | Song ......................... G06T 7/70 |

FOREIGN PATENT DOCUMENTS

| | | | |
|---|---|---|---|
| CN | 108600680 A | 9/2018 | |
| CN | 109922352 A | 6/2019 | |
| CN | 109963187 A | 7/2019 | |
| CN | 110163045 A | 8/2019 | |
| CN | 110333926 A | 10/2019 | |
| CN | 110442240 A | 11/2019 | |
| KR | 2014-0140916 A | 12/2014 | |
| WO | WO 2013/027893 A1 | 2/2013 | |
| WO | WO-2020173211 A1 * | 9/2020 | ............. G10L 15/22 |

* cited by examiner

LIVE STREAMING VIDEO INTERACTION METHOD AND APPARATUS, AND COMPUTER DEVICE

CROSS-REFERENCE TO RELATED APPLICATION

The present application is the U.S. National Stage of International Application No. PCT/CN2020/109871, filed on Aug. 18, 2020, which claims the priority of the Chinese Patent Application of Application Number 201911251115.7, filed with the National Intellectual Property Administration, PRC on Dec. 9, 2019, and entitled "Interaction Method for Live Video, Apparatus, and Computer Device", both of which are incorporated herein by reference in their entireties.

TECHNICAL FIELD

The present application relates to the field of multimedia technologies, and in particular to an interaction method for live video, an apparatus, a computer device, and a computer-readable storage medium.

BACKGROUND

With the rapid development of Internet technologies, live video, which is visual, fast, and highly interactive, has become an extremely extensive way of entertainment and is popular among people. During live video, the interaction between a user and a live streamer includes gift giving, like giving, and cheering for the live streamer. Various ways of presenting gifts can more effectively promote the production of high-quality live contents.

The inventor has appreciated that currently, the presentation of interaction such as gift giving, like giving, and cheering for the live streamer are usually realized in real time in the form of text and images in a public chatting area or a fixed area in a live streaming interface, with a simple mode of presentation and thus a limited level of interaction.

SUMMARY

The present application provides an interaction method for live video, an apparatus, a computer device, and a computer-readable storage medium, which are used to solve the problem of a simple mode of presentation and thus a limited sense of participation in interaction when a user interacts with a live streamer during live streaming.

First, in order to achieve the above object, the present application provides an interaction method for live video, the method including:

obtaining a live streaming video of a live streamer and an image of a user captured in real time by a user terminal; displaying the streaming video and the picture of the user in a same video play box; obtaining and recognizing a first gesture of a user in the picture of the user, and comparing the first gesture with a second gesture in a preset table for correspondence between gestures and special effects; obtaining, if the first gesture matches with the second gesture, a first video special effect corresponding to the second gesture by querying the table for correspondence between gestures and special effects; and displaying the first video special effect in the video play box.

In an example, displaying the streaming video and the picture of the user in a same video play box includes: playing the streaming video and the picture of the user in a first part and a second part of the video play box in a seamless stitching manner.

In an example, displaying the first video special effect in the video play box includes: obtaining a first palm position of the first gesture, and a first face position of the face of the live streamer in the streaming video; and displaying the video special effect extendingly with a start point at the first palm position and an end point at the first face position.

In an example, the method further includes: monitoring whether a palm of the first gesture has moved; obtaining, if the palm of the first gesture has moved, a second palm position of the moved palm of the first gesture; and changing the start point of the video special effect from the first palm position to the second palm position.

In an example, the method further includes: monitoring whether the face of the live streamer has moved; obtaining, if the face of the live streamer has moved, a second face position of the moved face of the live streamer; and changing the end point of the video special effect from the first face position to the second face position.

In an example, displaying the video special effect in the video play box includes: obtaining a face image of the live streamer in the streaming video; and synthesizing the face image and a facial special effect corresponding to the first gesture and displaying the same, where the facial special effect includes at least one of a clothing special effect and an expression special effect.

In an example, the method further includes: counting a gesture duration of the first gesture; and triggering, if the gesture duration is greater than or equal to a preset duration threshold, a second video special effect.

In addition, in order to achieve the above object, the present application further provides an interaction apparatus for live video, the apparatus including:

an obtaining module to obtain a streaming video of a live streamer and an image of a user captured in real time by a user terminal; a display module to display the streaming video and the image of the user in a same video play box; a recognition module to obtain and recognize a first gesture of a user in the image of the user; a determination module to compare the first gesture with a second gesture in a preset table for correspondence between gestures and special effects so as to determine whether the two matches with each other; and a query module to obtain, if the first gesture matches with the second gesture, a video special effect corresponding to the second gesture by querying the table for correspondence between gestures and special effects, where the display module is further to display the video special effect in the video play box.

Further, the present application further provides a computer device, which includes a memory and a processor, where the memory stores computer-readable instructions operable on the processor, the computer-readable instructions, upon being executed by the processor, cause to implement the following steps:

obtaining a streaming video of a live streamer and an image of a user captured in real time by a user terminal; displaying the streaming video and the image of the user in a same video play box; obtaining and recognizing a first gesture of a user in the image of the user, and comparing the first gesture with a second gesture in a preset table for correspondence between gestures and special effects; obtaining, if the first gesture matches with the second gesture, a first video special effect corresponding to the second gesture by querying the table for correspondence between gestures and special effects; and displaying the first video special effect in the video play box.

Further, in order to achieve the above object, the present application further provides a computer-readable storage medium storing computer-readable instructions, where the computer-readable instructions may be executed by at least one processor to cause the at least one processor to:

obtain a streaming video of a live streamer and an image of a user captured in real time by a user terminal; display the streaming video and the image of the user in a same video play box; obtain and recognize a first gesture of a user in the image of the user, and compare the first gesture with a second gesture in a preset table for correspondence between gestures and special effects; obtain, if the first gesture matches with the second gesture, a first video special effect corresponding to the second gesture by querying the table for correspondence between gestures and special effects; and display the first video special effect in the video play box.

In the interaction method for live video, the apparatus, the computer device, and the computer-readable storage medium provided in the present application, a streaming video of a live streamer and an image of a user captured in real time by a user terminal are obtained and displayed in the same video play box; a first gesture of a user in the picture of the user is obtained and recognized, and the first gesture is compared with a second gesture in a preset table for correspondence between gestures and special effects; and when the first gesture matches with the second gesture, a video special effect corresponding to the second gesture is obtained by querying the table for correspondence between gestures and special effects, and the video special effect is then displayed in the video play box. By means of the above operations, pictures for a live streamer and a user can be presented in the same interface, and the interaction between a user and a live streamer can be linked using video special effects, which enriches the way of interaction presentation, and strengthens the sense of participation in interaction.

DETAILED DESCRIPTION OF EMBODIMENTS

In order to make the objectives, technical solutions, and advantages of the present application clearer, the present application will be described in further detail below in conjunction with the accompanying drawings and embodiments. It should be understood that the specific embodiments described here are merely intended to explain the present application, but are not intended to limit the present application. All other embodiments obtained by those of ordinary skill in the art based on the embodiments of the present application without creative efforts shall fall within the scope of protection of the present application.

It should be noted that the descriptions related to "first", "second", etc. in the present application are merely used for the illustrative purpose, and should not be construed as indicating or implying the relative importance thereof or implicitly indicating the number of technical features indicated. Thus, features defined with "first" and "second" may explicitly or implicitly comprise at least one of the features. Additionally, technical solutions among various embodiments can be combined with each other, but they must be based on the realization by those of ordinary skill in the art. When a combination of technical solutions is contradictory or cannot be realized, it should be considered that such a combination of the technical solutions does not exist, and also does not fall within the scope of protection of the present application claimed.

Figure 1:
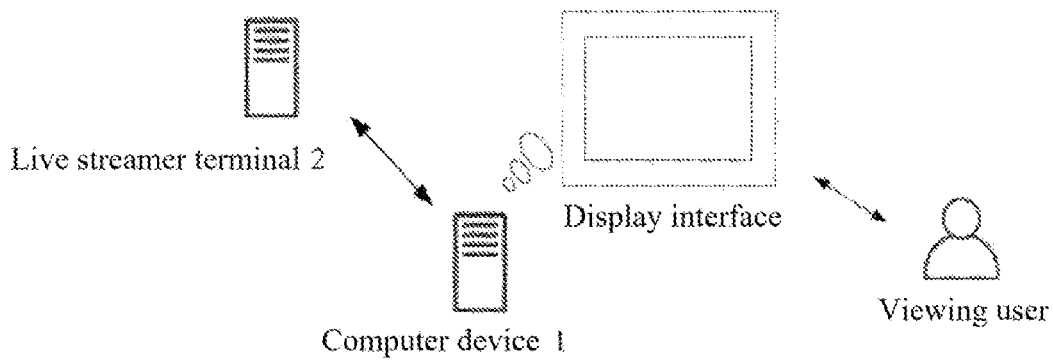
FIG. 1 is a scenario diagram of an optional application environment according to an embodiment of the present application.

FIG. 1 is a schematic diagram of an application environment according to an embodiment of the present application. Referring to FIG. 1, a computer device 1 is connected to a live streamer terminal 2, and may receive and obtain streaming video data sent by the live streamer terminal 2. In this embodiment, the computer device 1 is used as a user terminal, and may be an independent electronic device having a camera function, such as a mobile phone, a portable device, and a PC. The computer device may alternatively be an independent functional module that is attached to a main electronic device having a camera function and then helps the main electronic device to implement the function of interaction during live video.

Figure 2:
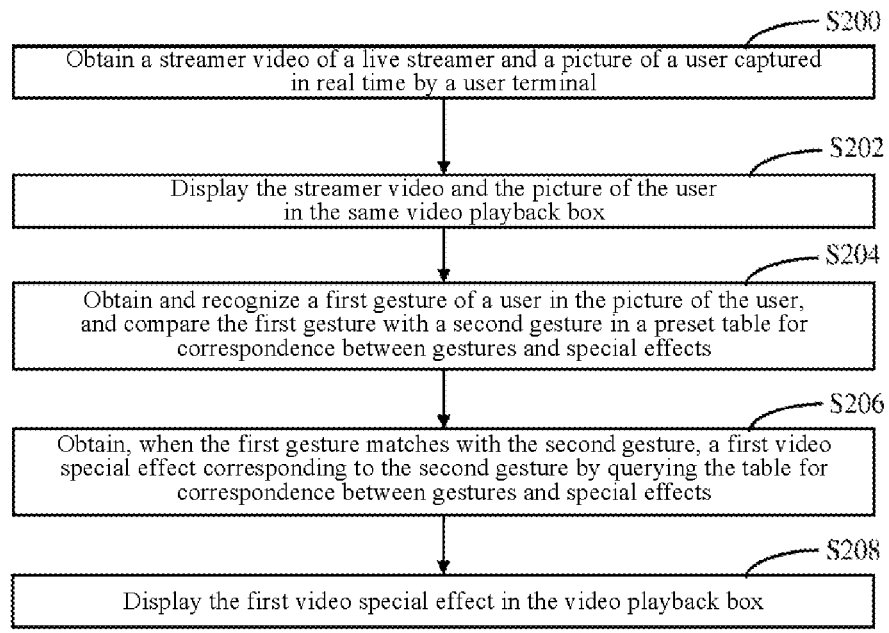
FIG. 2 is a schematic flowchart of an embodiment of an interaction method for live video according to the present application.

FIG. 2 is a schematic flowchart of an embodiment of an interaction method for live video according to the present application. It can be understood that the flow chart in this method embodiment is not used to limit the order of execution of the steps. An exemplary description is made below by taking a computer device as an execution subject.

As shown in FIG. 2, the method of interaction for live video may include steps S200 to S208.

In step S200, a streaming video of a live streamer and an image of a user captured in real time by a user terminal are obtained.

Specifically, the computer device 1 is connected to the live streamer terminal 2 through a network, and then may obtain a streaming video sent by the live streamer terminal 2. The streaming video is video data captured by the live streamer using the live streamer terminal 2 during live streaming. Certainly, as a terminal device of a user, the computer device 1 is provided with a camera unit for capturing an image of a user of a user. In other words, the computer device 1 can obtain the streaming video of the live streamer and an image of a user of a user.

In step S202, the streaming video and the image of the user are displayed in the same video play box.

Specifically, the computer device 1 further provides a display interface on which a video play box is provided for playing video data. In this embodiment, the video play box includes a first part and a second part, the first part being used for presenting the streaming video and the second part being used for presenting the image of the user, such that the obtained streaming video and the image of the user are played in the video play box.

It should be noted that in this embodiment, the computer device 1 plays the streaming video and the image of the user in the first part and the second part, for example, an upper part and a lower part or a left part and a right part, of the video play box in a seamless stitching manner. For example, the computer device 1 may set the first part and the second part as being in an upper-lower stitching mode when the streaming video is in a landscape mode, or may set the first part and the second part as being in a left-right stitching mode when the streaming video is in a portrait mode. Certainly, in other embodiments, both the streaming video and the image of the user are played in the video play box in other manners. For example, the streaming video and the image of the user are played with the two separated in the video play box, or with the two contained together therein in the form of large and small playback windows, which is not limited herein. In this embodiment, the streaming video and the image of the user are played in a stitching manner, such that videos of a live streamer and a user can be displayed within a same box. As such, the user may feel being close to the live streamer.

In step S204, a first gesture of a user in the image of the user is obtained and recognized, and the first gesture is compared with a second gesture in a preset table for correspondence between gestures and special effects.

In step S206, when the first gesture matches with the second gesture, a first video special effect corresponding to the second gesture is obtained by querying the table for correspondence between gestures and special effects.

In step S208, the first video special effect is displayed in the video play box.

Specifically, after displaying the image of the user and the streaming video in the video play box, the computer device 1 recognizes each frame from the image of the user by means of image recognition so as to obtain an image of a palm in each frame from the image of the user, and then recognizes a gesture. In this embodiment, the computer device 1 may pre-store a gesture recognition model that can recognize gestures, and then obtain an image in video data of the image of the user for recognition. When recognizing the first gesture in the image of the user, the computer device compares the first gesture with the second gesture in the preset table for correspondence between gestures and special effects. The table for correspondence between gestures and special effects includes a one-to-one correspondence between gestures and video special effects.

When the first gesture recognized by the computer device 1 matches with the second gesture in the table for correspondence between gestures and special effects, the computer device further finds out the first video special effect corresponding to the second gesture by querying the table for correspondence between gestures and special effects. Finally, the computer device 1 displays the first video special effect in the video play box.

Figure 3:
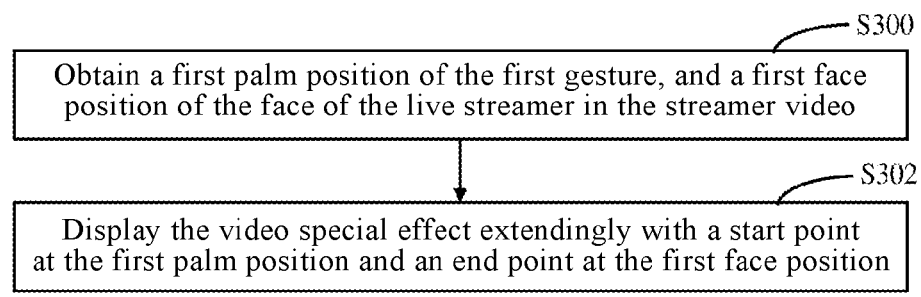
FIG. 3 is a flowchart of an exemplary embodiment of displaying the first video special effect in the video play box in step S208 in FIG. 2.

As shown in FIG. 3, in an exemplary embodiment, the process of displaying the first video special effect in the video play box in step S208 includes steps S300 to S302.

In step S300, a first palm position of the first gesture, and a first face position of the face of the live streamer in the streaming video are obtained.

In step S302, the video special effect is displayed extendingly with a start point at the first palm position and an end point at the first face position.

Specifically, after finding out, through querying, the first video special effect corresponding to the second gesture, the computer device 1 displays the video special effect in the image of the user and the streaming video. The computer device 1 first obtains a first position of a palm of the user that makes the first gesture in the image of the user, and then obtains the first face position of the live streamer in the streaming video. In this embodiment, because there is a relatively fixed relationship between positions of the image of the user and the streaming video in the video play box (that is, the positions remain unchanged within a short period of time), an image of the palm of the first gesture in an image of a user frame of the image of the user and a face image of the live streamer in a streaming video frame of the streaming video can be recognized by using a human body recognition model.

Figure 4:
FIG. 4 is a diagram showing the effect of a video special effect being displayed extendingly in a live streaming interface.

Then, the computer device 1 marks the first palm position based on relative position coordinates of the palm image in the frame of the image of the user; and the computer device marks the first face position based on relative position coordinates of the face image in the streaming video frame, where the relative position coordinates indicate the position of the palm image in the frame of the image of the user or the position of the face image in the streaming video frame. Finally, the computer device 1 displays the video special effect extendingly with the first palm position as the start point and the first face position as the end point. Referring to FIG. 4, a user gives a gesture of "heart", and then a video special effect brings in a series of hearts extending from an image of a user to a streaming video. In this way, the computer device 1 displays the video special effect in the image of the user and the streaming video in the form of "interaction", thereby enhancing interaction during live video.

Figure 5:
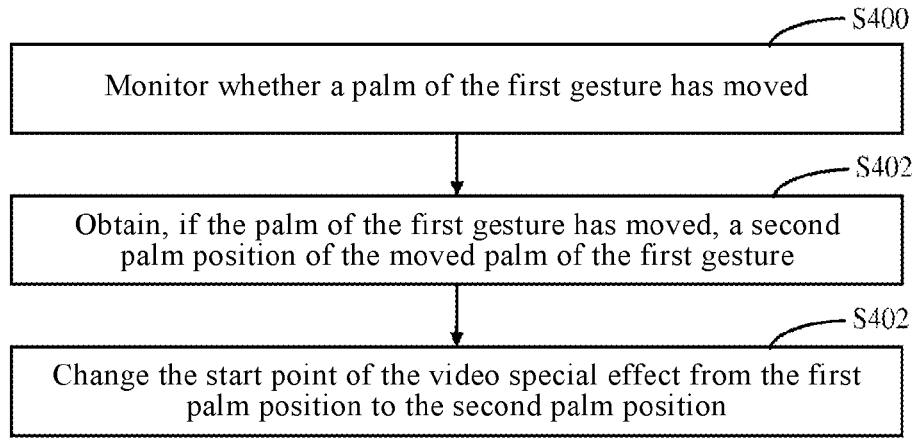
FIG. 5 is a schematic flowchart of an exemplary embodiment based on FIG. 3.

As shown in FIG. 5, in an exemplary embodiment, the process of displaying the first video special effect in the video play box in step S208 further includes steps S400 to S404, in addition to steps S300 to S302.

In step S400, it is monitored whether a palm of the first gesture has moved.

In step S402, if the palm of the first gesture has moved, a second palm position of the moved palm of the first gesture is obtained.

In step S404, the start point of the video special effect is changed from the first palm position to the second palm position.

In this embodiment, in the process of the computer device 1 displaying the video special effect extendingly with the first palm position as the start point and the first face position as the end point, the computer device also continues to monitor whether the palm of the first gesture has moved. If the palm of the first gesture has moved, the computer device obtains a second palm position of the palm after movement, and then changes the start point of the video special effect from the first palm position to the second palm position.

Figure 6:
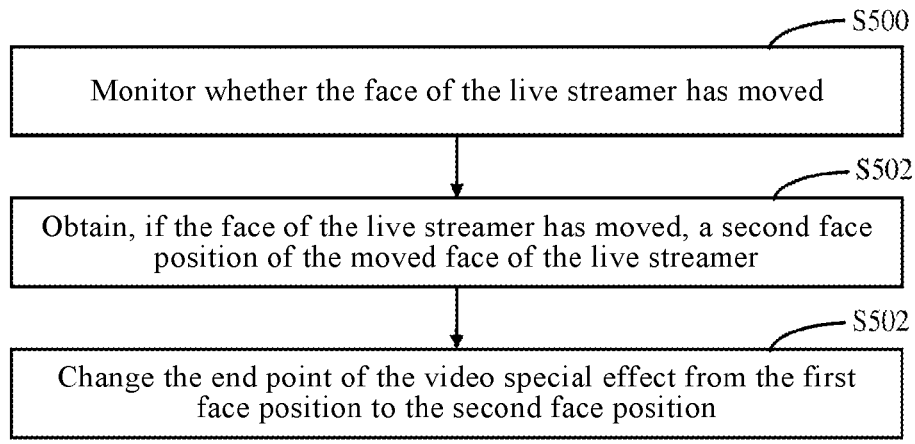
FIG. 6 is a schematic flowchart of another exemplary embodiment based on FIG. 3.

As shown in FIG. 6, in another exemplary embodiment, the process of displaying the first video special effect in the video play box in step S208 further includes steps S500 to S504, in addition to steps S300 to S302.

In step S500, it is monitored whether the face of the live streamer has moved.

In step S502, if the face of the live streamer has moved, a second face position of the moved face of the live streamer is obtained.

In step S504, the end point of the video special effect is changed from the first face position to the second face position.

In this embodiment, in the process of the computer device 1 displaying the video special effect extendingly with the first palm position as the start point and the first face position as the end point, the computer device also continues to monitor whether the face of the live streamer has moved. If the face of the live streamer has moved, a second face position of the face after movement is obtained, and the start point of the video special effect is then changed from the first face position to the second face position.

The start point and the end point of the video special effect are adjusted by monitoring the palm position of the first gesture and the face position of the live streamer, so that the "targeted" extension of the video special effect in interaction during live video can be improved, thereby enhancing the interactive effect.

Figure 7:
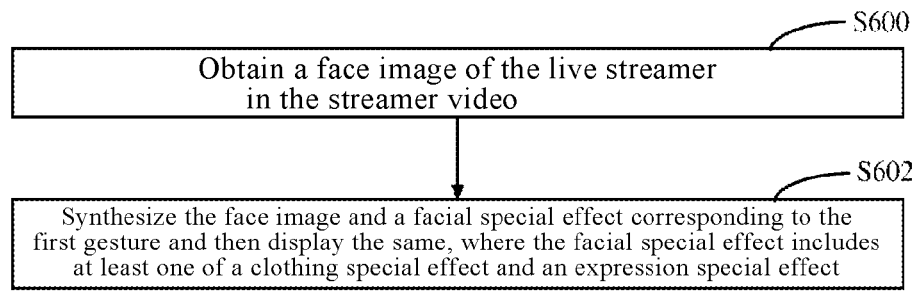
FIG. 7 is a flowchart of another exemplary embodiment of displaying the first video special effect in the video play box in step S208 in FIG. 2.

As shown in FIG. 7, in an exemplary embodiment, the process of displaying the first video special effect in the video play box in step S208 includes steps S600 to S602.

In step S600, a face image of the live streamer in the streaming video is obtained.

In step S602, the face image and a facial special effect corresponding to the first gesture are synthesized and then displayed, where the facial special effect includes at least one of a clothing special effect and an expression special effect.

Figure 8:
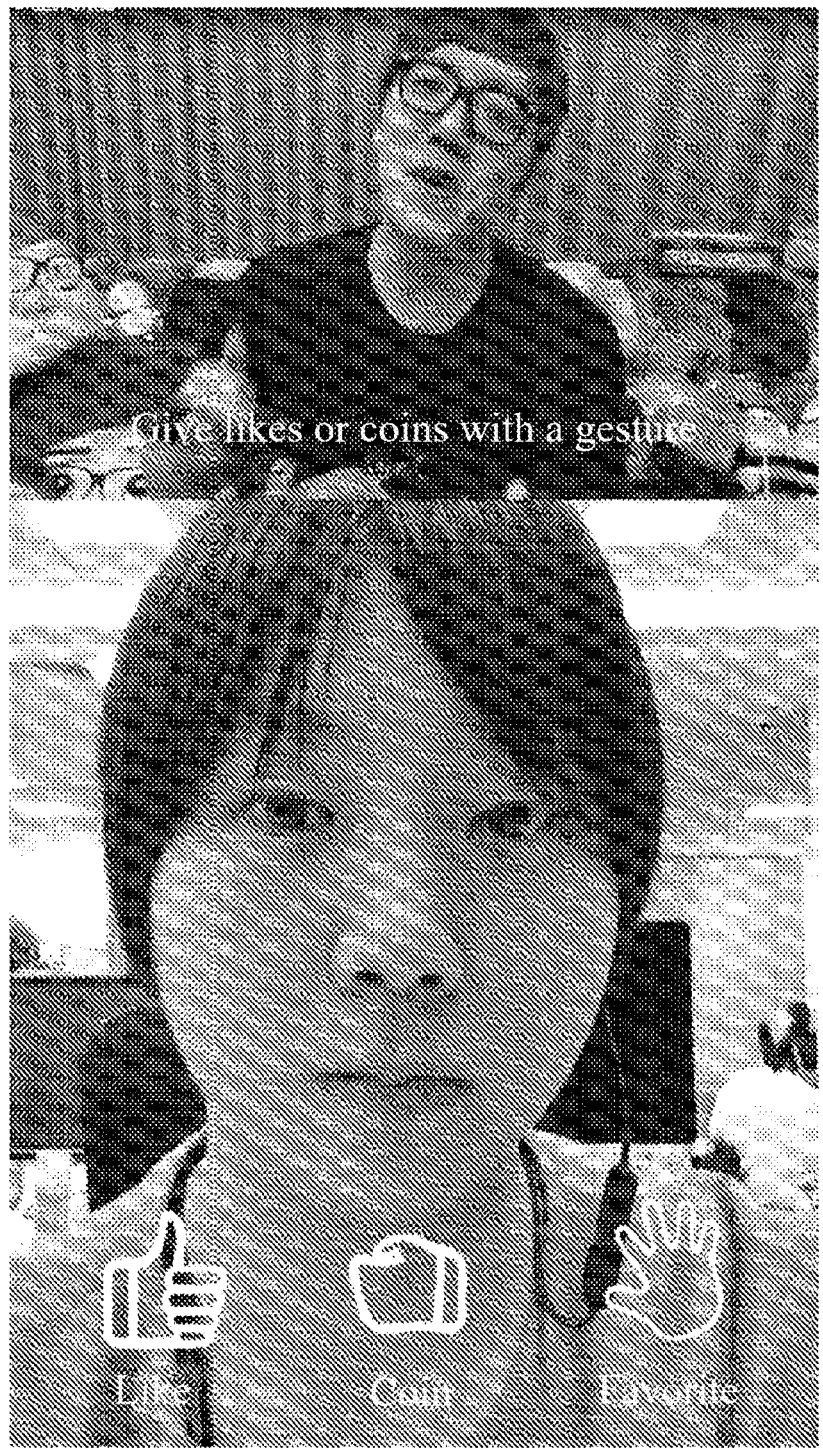
FIG. 8 is a diagram showing the effect of a live streaming interface before a facial special effect.
Figure 9:
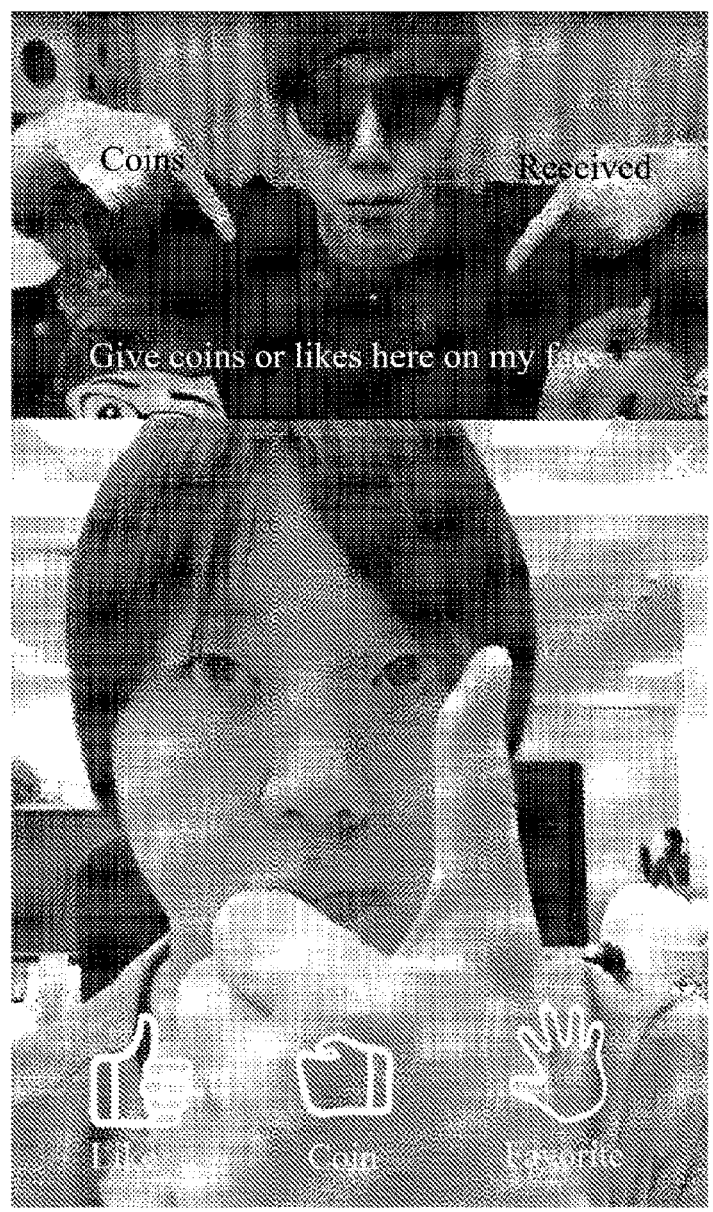
FIG. 9 is a diagram showing the effect of a live streaming interface after the facial special effect.

In this embodiment, the computer device 1 recognizes the first gesture and determines that the first gesture matches with the second gesture in the table for correspondence between gestures and special effects, and thus triggers a video special effect corresponding to the first gesture. The video special effect involves synthesizing a preset facial special effect and a face image of the current live streamer in the streaming video and then displaying the same. The facial special effect includes a clothing special effect or an expression special effect. For example, FIG. 8 shows a usual live streaming interface, and FIG. 9 shows a live streaming interface after the use of a facial special effect. As shown in FIG. 9, a first gesture for coin giving is generated in the lower image for the user, and the first gesture for coin giving can trigger a facial special effect of adding sunglasses onto the current face image of a live streamer. Therefore, the computer device 1 displays, in the upper streaming video, a face image of the live streamer with the facial special effect added. The triggering of the video special effect in the face image of the live streamer by a user can also well enhance the interactive effect.

Figure 10:
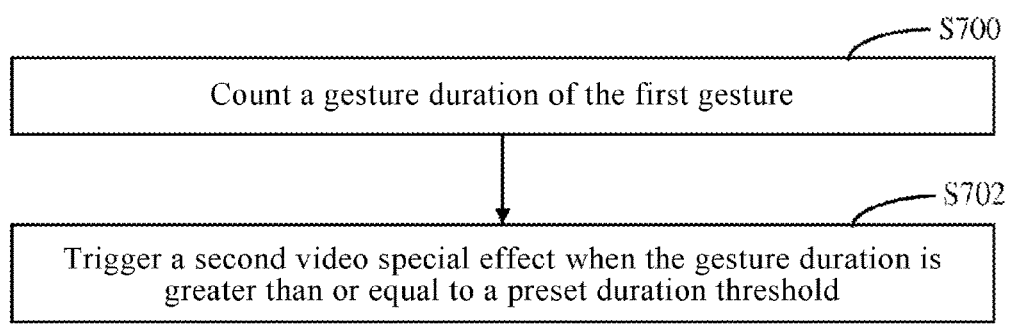
FIG. 10 is a schematic flowchart of an exemplary embodiment based on FIG. 2.

As shown in FIG. 10, in an exemplary embodiment, the method for playing live video further includes steps S700 to S702, in addition to steps S200 to S208 described above.

In step S700, a gesture duration of the first gesture is counted.

In step S702, a second video special effect is triggered when the gesture duration is greater than or equal to a preset duration threshold.

Specifically, after the computer device 1 displays the video special effect in the video play box, the computer device also continues to monitor the gesture duration of the first gesture. The second video special effect is triggered when the gesture duration is greater than or equal to a preset threshold. Certainly, the second video special effect may alternatively be a further enhancement of the video special effect, such as a change in the color and shape. In this way, the interactive effect during live video is further enhanced.

It can be learned from above that by means of the method of interaction for live video provided in this embodiment, a streaming video of a live streamer and an image of a user captured in real time by a user terminal can be obtained and displayed in the same video play box; then a first gesture of a user in the image of the user are obtained and recognized, and the first gesture is compared with a second gesture in a preset table for correspondence between gestures and special effects; and when the first gesture matches with the second gesture, a video special effect corresponding to the second gesture is obtained by querying the table for correspondence between gestures and special effects, and the video special effect is then displayed in the video play box. By means of the above operations, images for a live streamer and a user can be presented in the same interface, and the interaction between a user and a live streamer can be linked using video special effects, which enriches the way of interaction presentation, and strengthens the sense of participation in interaction.

Figure 11:
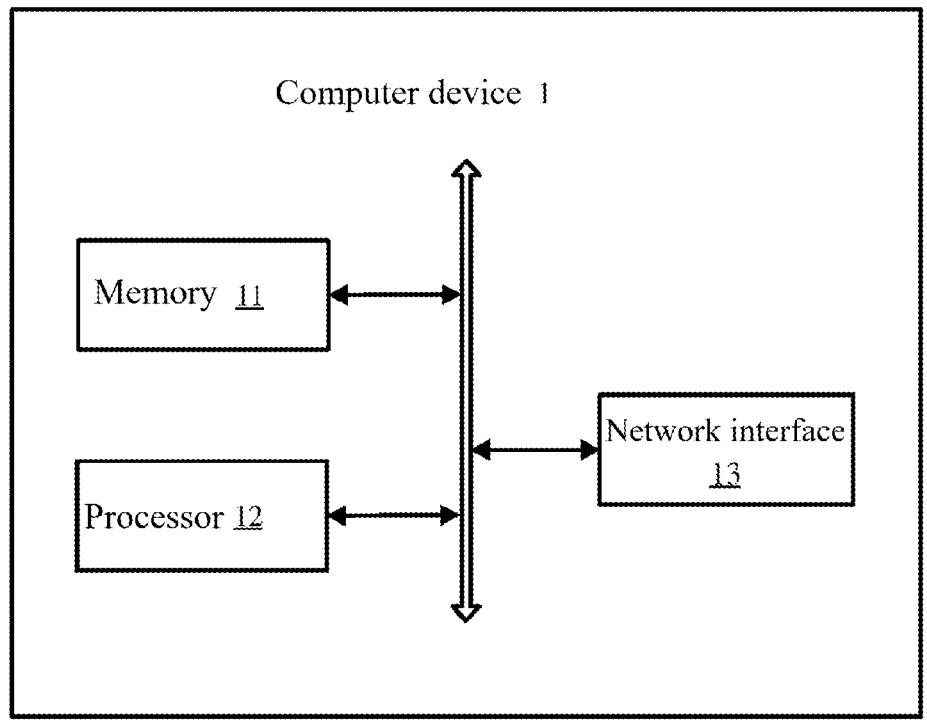
FIG. 11 is a schematic diagram of an optional hardware architecture of a computer device according to the present application.

In addition, the present application further provides a computer device. FIG. 11 is a schematic diagram of an optional hardware architecture of a computer device according to the present application.

In this embodiment, the computer device 1 may include, but is not limited to, a storage 11, a processor 12, and a network interface 13 that can be communicatively connected to each other via a system bus. The computer device 1 is connected to a network (not shown in FIG. 11) through the network interface 13, and is connected to a live streamer terminal, etc. (not shown in FIG. 11) through the network to perform data exchange. The network may be a wireless or wired network such as Intranet, Internet, a global system of mobile communication (GSM), wideband code division multiple access (WCDMA), a 4G network, a 5G network, Bluetooth, Wi-Fi, or a telephone network.

It should be noted that FIG. 11 shows only the computer device 1 having components 11 to 13, but it should be understood that not all of the illustrated components are required to be implemented, and more or fewer components may be implemented instead.

The storage 11 includes at least one type of readable storage medium, and the readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the storage 11 may be an internal storage unit of the computer device 1, for example, a hard disk or a memory of the computer device 1. In some other embodiments, the storage 11 may alternatively be an external storage device of the computer device 1, for example, a plug-in hard disk disposed on the computer device 1, a smart media card (SMC), a secure digital (SD) card, a flash card, etc. Certainly, the storage 11 may alternatively include both the internal storage unit of the computer device 1 and the external storage device thereof. In this embodiment, the storage 11 is generally used to store an operating system and various types of application software installed in the computer device 1, such as program code of a baffle application and program code of an apparatus 200 of interaction for live video. In addition, the storage 11 may be further used to temporarily store various types of data that has been output or will be output.

The processor 12 may be, in some embodiments, a central processing unit (CPU), a controller, a microcontroller, a microprocessor, or other data processing chips. The processor 12 is generally used to control the overall operation of the computer device 1, for example, performing data exchange or communication-related control and processing, etc. In this embodiment, the processor 12 is used to run program code stored in the storage 11 or process data, for example, to run an application of the apparatus 200 of interaction for live video. This is not limited herein.

The network interface 13 may include a wireless network interface or a wired network interface. The network interface 13 is usually used to establish a communicative connection between the computer device 1 and a live streamer terminal.

In this embodiment, the apparatus 200 of interaction for live video is installed and run in the computer device 1. When the apparatus 200 of interaction for live video is run, the computer device can obtain a streaming video of a live streamer and an image of a user captured in real time by a user terminal, and display the streaming video and the image of the user in a same video play box; then the computer device obtains and recognizes a first gesture of a user in the image of the user, and compares the first gesture with a second gesture motion in a preset table for correspondence between gestures and special effects; and the computer device finds out, when the first gesture matches with the second gesture, a video special effect corresponding to the second gesture obtained by querying the table for correspondence between gestures and special effects is displayed in the video play box. By means of the above operations, images for a live streamer and a user can be presented in the same interface, and the interaction between a user and a live streamer can be linked using video special effects, which enriches the way of interaction presentation, and strengthens the sense of participation in interaction.

Heretofore, the hardware structure and functions of the computer device of the present application have been described in detail. Embodiments of the present application are provided below based on the computer device described above.

Figure 12:
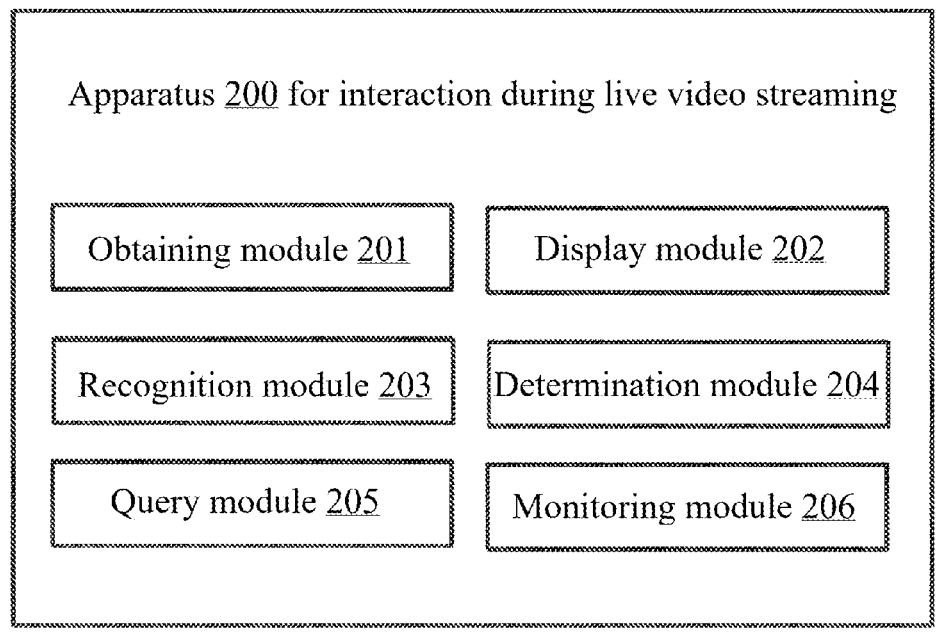
FIG. 12 is a schematic diagram of program modules in an embodiment of an interaction apparatus for live video according to the present application.

FIG. 12 is a diagram of program modules in an embodiment of an apparatus 200 of interaction for live video according to the present application.

In this embodiment, the apparatus 200 of interaction for live video includes a series of computer-readable instructions stored in the storage 11, and when the computer-readable instructions are executed by the processor 12, an interactive function during live video in this embodiment of the present application can be implemented. In some embodiments, the apparatus 200 of interaction for live video may be divided into one or more modules on the basis of specific operations implemented by various parts of the computer-readable instructions. For example, in FIG. 12, the apparatus 200 of interaction for live video may be divided into an obtaining module 201, a display module 202, a recognition module 203, a determination module 204, a query module 205, and a monitoring module 206. In the modules:

the obtaining module 201 is to obtain a streaming video of a live streamer and an image of a user captured in real time by a user terminal.

Specifically, the computer device is connected to the live streamer terminal through a network, and then may obtain a streaming video sent by the live streamer terminal. The streaming video is video data captured by the live streamer using the live streamer terminal during live streaming. Certainly, as a terminal device of a user, the computer device is provided with a camera unit for capturing an image of a user of a user. Therefore, the obtaining module 201 can obtain the streaming video of the live streamer and the image of the user.

The display module 202 is to display the streaming video and the image of the user in a same video play box.

Specifically, the computer device further provides a display interface on which a video play box is provided for playing video data. In this embodiment, the video play box includes a first part and a second part, the first part used for presenting the streaming video and the second part used for presenting the image of the user, such that the display module 202 can play the obtained streaming video and image for the user in the video play box.

It should be noted that in this embodiment, the display module 202 plays the streaming video and the image of the user in the first part and the second part, for example, an upper part and a lower part or a left part and a right part, of the video play box in a seamless stitching manner. For example, the computer device 1 may set the first part and the second part as being in an upper-lower stitching mode when the streaming video is in a landscape mode, or may set the first part and the second part as being in a left-right stitching mode when the streaming video is in a portrait mode. Certainly, in other embodiments, the display module 202 may alternatively play both the streaming video and the image of the user in the video play box in other manners. For example, the streaming video and the image of the user are played with the two separated in the video play box, or with the two contained together therein in the form of large and small playback windows, which is not limited here. In this embodiment, the streaming video and the image of the user are played in a stitching manner, such that videos of a live streamer and a user can be displayed within a same box. As such, the user may feel being close to the live streamer.

The recognition module 203 is to obtain and recognize a first gesture of a user in the image of the user.

The determination module 204 is to compare the first gesture with a second gesture in a preset table for correspondence between gestures and special effects so as to determine whether the two matches with each other.

The query module 205 is to obtain, if the first gesture matches with the second gesture, a video special effect corresponding to the second gesture by querying the table for correspondence between gestures and special effects.

The display module 202 is further to display the video special effect in the video play box.

Specifically, after the display module 202 displays the image of the user and the streaming video in the video play box, the recognition module 203 recognizes each frame from the image of the user by means of image recognition so as to obtain an image of a palm in each frame from the image of the user and then recognizes a gesture. In this embodiment, the computer device may pre-store a gesture recognition model that can recognize gestures, and then the recognition module 203 may invoke the gesture recognition model to recognize an image in obtained video data of the image of the user. When the recognition module 203 recognizes the first gesture in the image of the user, the determination module 204 compares the first gesture with the second gesture in the preset table for correspondence between gestures and special effects to determine whether the two matches with each other. The table for correspondence between gestures and special effects includes a one-to-one correspondence between gestures and video special effects.

When the determination module 204 determines that the first gesture matches with the second gesture in the table for correspondence between gestures and special effects, the query module 205 further finds out the first video special effect corresponding to the second gesture by querying the table for correspondence between gestures and special effects. Finally, the display module 202 displays the first video special effect in the video play box.

In this embodiment, the process of the display module 202 displaying the first video special effect in the video play box includes: obtaining a first palm position of the first gesture, and a first face position of the face of the live streamer in the streaming video; and displaying the video special effect extendingly with a start point at the first palm position and an end point at the first face position.

Specifically, the display module 202 first obtains a first position of a palm of the user that makes the first gesture in the image of the user, and then obtains the first face position of the live streamer in the streaming video. In this embodiment, because there is a relatively fixed relationship between positions of the image of the user and of the streaming video in the video play box (that is, the positions remain unchanged within a short period of time), an image of the palm making the first gesture in a frame from the image of the user and a face image of the live streamer in a streaming video frame of the streaming video can be recognized by using a human body recognition model.

Then, the display module 202 marks the first palm position based on relative position coordinates of the palm image in the frame of the image of the user; and the display module marks the first face position based on relative position coordinates of the face image in the streaming video frame, where the relative position coordinates indicate the position of the palm image in the frame of the image of the user or the position of the face image in the streaming video frame. Finally, the display module 202 displays the video special effect extendingly with the first palm position as the start point and the first face position as the end point. Referring to FIG. 4, a user gives a gesture of "heart", and then a video special effect brings in a series of hearts extending from an image of a user to a streaming video. In this way, the computer device 1 displays the video special effect in the image of the user and the streaming video in the form of "interaction", thereby enhancing interaction during live video.

The monitoring module 206 is to monitor whether a palm of the first gesture has moved in the process of the display module 202 displaying the first video special effect in the video play box.

The display module 202 is further to obtain, if the palm of the first gesture has moved, a second palm position of the moved palm of the first gesture, and to change the start point of the video special effect from the first palm position to the second palm position.

The monitoring module 206 is further to monitor whether the face of the live streamer has moved in the process of the display module 202 displaying the first video special effect in the video play box.

The display module 202 is further to obtain, if the face of the live streamer has moved, a second face position of the moved face of the live streamer, obtain a second palm position of the moved palm of the first gesture, and to change the end point of the video special effect from the first face position to the second face position.

The start point and the end point of the video special effect are adjusted by monitoring the palm position of the first gesture and the face position of the live streamer, so that the "targeted" extension of the video special effect in interaction during live video can be improved, thereby enhancing the interactive effect.

In another embodiment, the display module 202 is further to obtain a face image of the live streamer in the streaming video, to synthesize the face image and a facial special effect corresponding to the first gesture and to display the same, where the facial special effect includes at least one of a clothing special effect and an expression special effect.

In this embodiment, presetting the video special effect by the computer device includes: synthesizing a preset facial special effect and a face image of the current live streamer in the streaming video and then displaying the same. The facial special effect includes a clothing special effect or an expression special effect. For example, FIG. 8 shows a usual live streaming interface, and FIG. 9 shows a live streaming interface after the use of a facial special effect. As shown in FIG. 9, a first gesture for coin giving is generated in the lower image for the user, and the first gesture for coin giving can trigger a facial special effect of adding sunglasses onto the current face image of a live streamer. Therefore, the display module 202 displays, in the upper streaming video, a face image of the live streamer with the facial special effect added. The triggering of the video special effect in the face image of the live streamer by a user can also well enhance the interactive effect.

Certainly, in another embodiment, the monitoring module 206 is further to count a gesture duration of the first gesture.

The display module 202 is further to trigger, if the gesture duration is greater than or equal to a preset duration threshold, a second video special effect.

Specifically, after the display module 202 displays the video special effect in the video play box, the monitoring module 206 continues to monitor the gesture duration of the first gesture. When the monitoring module 206 determines that the gesture duration is greater than or equal to a preset threshold, the display module 202 triggers the display of the second video special effect. Certainly, the second video special effect may alternatively be a further enhancement of the video special effect, such as a change in the color and shape. In this way, the interactive effect during live video is further enhanced.

It can be learned from above that the computer device can obtain a streaming video of a live streamer and an image of a user captured in real time by a user terminal, and display the streaming video and the image of the user in a same video play box; then the computer device obtains and recognizes a first gesture of a user in the image of the user, and compares the first gesture with a second gesture in a preset table for correspondence between gestures and special effects; and the computer device finds out, when the first gesture matches with the second gesture, a video special effect corresponding to the second gesture obtained by querying the table for correspondence between gestures and special effects is displayed in the video play box. By means of the above operations, images for a live streamer and a user can be presented in the same interface, and the interaction between a user and a live streamer can be linked using video special effects, which enriches the way of interaction presentation, and strengthens the sense of participation in interaction.

The serial numbers of the embodiments of the present application described above are merely for description, and do not indicate that the embodiments are good or bad.

Through the description of the above implementations, those skilled in the art can clearly understand that the methods in the above embodiments can be implemented by software and necessary general hardware platforms. Definitely, the implementations can also be implemented by hardware. However, in many cases, the former implementation is preferred. Based on such understanding, the technical solutions of the present application substantially, or the part(s) thereof making contributions to the prior art, can be embodied in the form of a software product. The computer software product is stored in a storage medium (such as a ROM/RAM, a magnetic disk, or an optical disk), which includes several instructions to enable a terminal device (which may be a mobile phone, a computer, a server, an air conditioner, a network device, etc.) to perform the method described in the embodiments of the present application, the method including:

obtaining a streaming video of a live streamer and an image of a user captured in real time by a user terminal; displaying the streaming video and the image of the user in a same video play box; obtaining and recognizing a first gesture of a user in the image of the user, and comparing the first gesture with a second gesture in a preset table for correspondence between gestures and special effects; obtaining, if the first gesture matches with the second gesture, a first video special effect corresponding to the second gesture by querying the table for correspondence between gestures and special effects; and displaying the first video special effect in the video play box.

The foregoing descriptions are merely illustrative of preferred embodiments of the present application, and are not intended to limit the patent scope of the present application. Any equivalent structure or equivalent process transformation made using the contents of the description and accompanying drawings of the present application, or any direct or indirect application thereof in other related technical fields shall equally fall within the patent protection scope of the present application.

What is claimed is:

1. A method of interacting with live videos, comprising:
obtaining a streaming video of a live streamer;
obtaining images of a user captured in real time by a user terminal;
displaying the streaming video and the images of the user in a same video play box;
obtaining and recognizing a first gesture of the user in the images;
comparing the first gesture with a second gesture included in a preset table, wherein the preset table comprises information indicating corresponding relationships between gestures and special effects;
obtaining a first special effect corresponding to the second gesture by querying the preset table in response to determining that the first gesture matches the second gesture; and
displaying the first special effect in the video play box.

2. The method of claim 1, wherein the displaying the streaming video and the images of the user in a same video play box comprises:
playing the streaming video and the images of the user in a first part and a second part of the video play box respectively in a seamless stitching manner.

3. The method of claim 1, wherein the displaying the first special effect in the video play box comprises:
obtaining a first palm position associated with the first gesture;
obtaining a first face position associated with a face of the live streamer in the streaming video; and
displaying the first special effect by extending from the first palm position as a start point to the first face position as an end point.

4. The method of claim 3, further comprising:
monitoring whether a hand palm associated with the first gesture moves;
in response to determining that the hand palm associated with the first gesture moves, obtaining a second palm position associated with the first gesture after a movement of the hand palm; and
changing the start point of the first special effect from the first palm position to the second palm position.

5. The method of claim 3, further comprising:
monitoring whether the face of the live streamer moves;
in response to determining that the face of the live streamer moves, obtaining a second face position associated with the live streamer after a movement of the face of the live streamer; and
changing the end point of the first special effect from the first face position to the second face position.

6. The method of claim 1, wherein the displaying the first special effect in the video play box comprises:
obtaining a face image of the live streamer in the streaming video;
synthesizing the face image and a facial special effect corresponding to the first gesture; and
displaying a synthesized image comprising the face image and the facial special effect, wherein the facial special effect comprises at least one of a clothing special effect and an expression special effect.

7. The method of claim 1, further comprising:
determining a gesture duration of the first gesture; and
triggering a second special effect in response to determining that the gesture duration is greater than or equal to a predetermined duration threshold.

8. A computer device, comprising a memory and a processor, wherein the memory stores computer-readable instructions operable on the processor, and wherein the computer-readable instructions, upon being executed by the processor, cause the processor to implement operations comprising:
obtaining a streaming video of a live streamer;
obtaining images of a user captured in real time by a user terminal;
displaying the streaming video and the images of the user in a same video play box;
obtaining and recognizing a first gesture of the user in the images;
comparing the first gesture with a second gesture included in a preset table, wherein the preset table comprises information indicating corresponding relationships between gestures and special effects;
obtaining a first special effect corresponding to the second gesture by querying the preset table in response to determining that the first gesture matches the second gesture; and
displaying the first special effect in the video play box.

9. The computer device of claim 8, wherein the displaying the streaming video and the images of the user in a same video play box comprises:
playing the streaming video and the images of the user in a first part and a second part of the video play box respectively in a seamless stitching manner.

10. The computer device of claim 8, wherein the displaying the first special effect in the video play box comprises:
obtaining a first palm position associated with the first gesture;
obtaining a first face position associated with a face of the live streamer in the streaming video; and
displaying the first special effect by extending from the first palm position as a start point to the first face position as an end point.

11. The computer device of claim 10, the computer-readable instructions, upon being executed by the processor, further cause the processor to implement operations comprising:
monitoring whether a hand palm associated with the first gesture moves;
in response to determining that the hand palm associated with the first gesture moves, obtaining a second palm position associated with the first gesture after a movement of the hand palm; and
changing the start point of the first special effect from the first palm position to the second palm position.

12. The computer device of claim 10, the computer-readable instructions, upon being executed by the processor, further cause the processor to implement operations comprising:
monitoring whether the face of the live streamer moves;
in response to determining that the face of the live streamer moves, obtaining a second face position associated with the live streamer after a movement of the face of the live streamer; and
changing the end point of the first special effect from the first face position to the second face position.

13. The computer device of claim 8, wherein the displaying the first special effect in the video play box comprises:
obtaining a face image of the live streamer in the streaming video;
synthesizing the face image and a facial special effect corresponding to the first gesture; and
displaying a synthesized image comprising the face image and the facial special effect, wherein the facial special effect comprises at least one of a clothing special effect and an expression special effect.

14. The computer device of claim 8, the computer-readable instructions, upon being executed by the processor, further cause the processor to implement operations comprising:
determining a gesture duration of the first gesture; and
triggering a second special effect in response to determining that the gesture duration is greater than or equal to a predetermined duration threshold.

15. A non-transitory computer-readable storage medium computer-readable instructions, the computer-readable instructions being executable by at least one processor to cause the at least one processor to perform operations comprising:
obtaining a streaming video of a live streamer;
obtaining images of a user captured in real time by a user terminal;
displaying the streaming video and the images of the user in a same video play box;
obtaining and recognizing a first gesture of the user in the images;
comparing the first gesture with a second gesture included in a preset table, wherein the preset table comprises information indicating corresponding relationships between gestures and special effects;
obtaining a first special effect corresponding to the second gesture by querying the preset table in response to determining when the first gesture matches the second gesture; and
displaying the first special effect in the video play box.

16. The non-transitory computer-readable storage medium of claim 15, wherein the displaying the streaming video and the images of the user in a same video play box comprises:
playing the streaming video and the images of the user in a first part and a second part of the video play box respectively in a seamless stitching manner.

17. The non-transitory computer-readable storage medium of claim 15, wherein the displaying the first special effect in the video play box comprises:
obtaining a first palm position associated with the first gesture;
obtaining a first face position associated with a face of the live streamer in the streaming video; and
displaying the first special effect by extending from the first palm position as a start point to the first face position as an end point.

18. The non-transitory computer-readable storage medium of claim 17, the computer-readable instructions, upon being executed by the processor, further cause the at least one processor to perform operations comprising:
monitoring whether a hand palm associated with the first gesture moves, obtaining a second palm position associated with the first gesture after a movement of the hand palm in response to determining that the hand palm associated with the first gesture moves, and changing the start point of the first special effect from the first palm position to the second palm position; or
monitoring whether the face of the live streamer moves, obtaining a second face position associated with the live streamer after a movement of the face of the live streamer in response to determining that the face of the live streamer moves, and changing the end point of the first special effect from the first face position to the second face position; or
determining a gesture duration of the first gesture and triggering a second special effect in response to determining that the gesture duration is greater than or equal to a predetermined duration threshold.

19. The non-transitory computer-readable storage medium of claim 15, wherein the displaying the first special effect in the video play box comprises:
obtaining a face image of the live streamer in the streaming video;
synthesizing the face image and a facial special effect corresponding to the first gesture; and
displaying a synthesized image comprising the face image and the facial special effect, wherein the facial special effect comprises at least one of a clothing special effect and an expression special effect.

* * * * *